(No Model.)
F. W. ROBERTSHAW.
VALVE FOR TAPPING MAINS.
No. 583,583. Patented June 1, 1897.
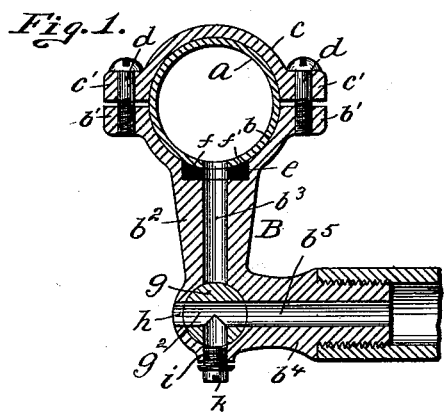
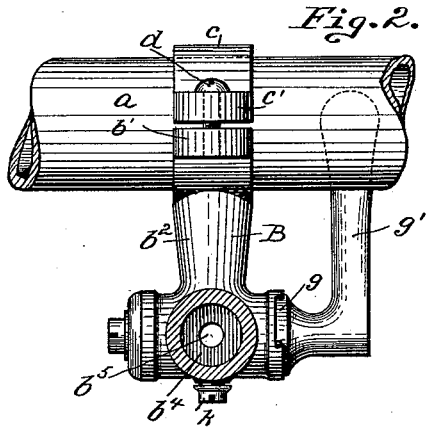
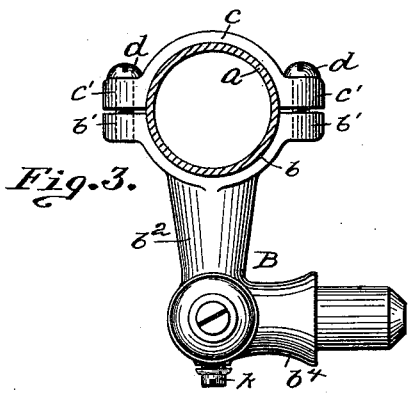
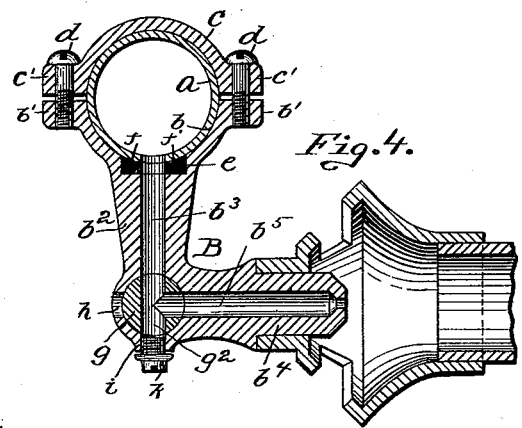
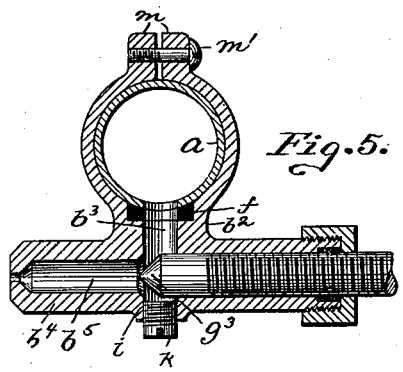
Witnesses:
Inventor:
Fredick W. Robertshaw
By Kay & Totten
Attorneys

UNITED STATES PATENT OFFICE.

FREDERICK W. ROBERTSHAW, OF PITTSBURG, PENNSYLVANIA, ASSIGNOR OF ONE-HALF TO WILLIAM A. HOEVELER, OF SAME PLACE.

VALVE FOR TAPPING MAINS.

SPECIFICATION forming part of Letters Patent No. 583,583, dated June 1, 1897.

Application filed January 28, 1896. Serial No. 577,126. (No model.)

*To all whom it may concern:*

Be it known that I, FREDERICK W. ROBERTSHAW, a resident of Pittsburg, in the county of Allegheny and State of Pennsylvania, have invented a new and useful Improvement in Valves for Tapping Mains; and I do hereby declare the following to be a full, clear, and exact description thereof.

My invention relates to the tapping of pipes and to the valves employed therewith.

The several objects of my invention are to provide means for tapping the pipes and securing the valves to control the openings made without the necessity of removing the fittings where the pipe has been already fitted up, to form a closely-packed joint between the pipe and the valve, and to provide means for cleaning the valve when the gas or other fluid is shut off without removing any of its parts.

My invention comprises certain novel features, all of which will be fully hereinafter set forth and claimed.

To enable others skilled in the art to make and use my invention, I will describe the same more fully, referring to the accompanying drawings, in which—

Figure 1 is a sectional view of my invention. Fig. 2 is a top view. Fig. 3 is a side view. Fig. 4 is a sectional view of my invention, showing the valve open; and Fig. 5 is a modified form.

Like letters indicate like parts in each of the figures.

Although I do not limit my invention to any particular use, said invention will be found to be very applicable to the tapping of gas-pipes, such as are employed in connection with the heating of ranges or stoves. These pipes are fitted up on the outside of the range or stove and are tapped and supplied with valves controlling the flow of gas to smaller pipes leading to the openings in the top of the range where the burners are located, or to the oven, water-back, &c.

Let $a$ in the drawings represent such a gas-pipe referred to above. The valve-body B has the concave seat $b$ formed therein, said seat conforming to the curved surface of the pipe $a$. A saddle $c$ engages with the remaining surface of the pipe not inclosed by the recess $b$, and in this way a ring is formed about said pipe. The saddle $c$ has the lugs $c'$ formed thereon, coinciding with the lugs $b'$ on the valve-body. Screws $d$ engage openings in said lugs and afford means for tightening the ring around the pipe. I do not limit myself, however, to this particular construction, as I might employ a split ring formed entirely integral with the valve-body and adapted to be clamped around the pipe, as shown in Fig. 5.

Formed within the valve-body B is a seat $e$, adapted to receive the washer $f$. This washer is formed of rubber or other suitable material and has preferably the concave face $f'$, conforming to the curve of the pipe. When the ring is tightened around the pipe, the washer $f$ forms a very tight joint between the pipe and ring. A washer with a straight face may, however, be employed.

The valve-body B consists of the vertical portion $b^2$, with the passage $b^3$ formed therein, and the portion $b^4$ at an angle thereto, with the passage $b^5$ formed therein, communicating with the passage $b^3$. A valve $g$ controls the communication between the passages $b^3$ $b^5$, said valve being operated by the handle $g'$.

In line with the passage $b^5$ is the opening $h$, formed in the valve-body. This opening will be closed when the valve is open, as shown in Fig. 4; but when the valve is closed, as shown in Fig. 1, the valve-opening $g^2$ coincides with the opening $h$ and the passage $b^5$. In this way access can be had for the purpose of cleaning the valve and the passage $b^5$ in case they become clogged up with foreign matter. By the insertion of a suitable instrument this foreign matter may be removed without difficulty and without the necessity of removing any of the parts. This is of particular importance in gas ranges or stoves and in the conveyance of other liquids likely to congeal, as the valves get clogged up and greatly reduce the pressure of the gas and the heat of the range or completely close the pipe where liquid is employed. The gas-outlet may be reached in this way also by a suitable drilling-tool in case it is desired to enlarge said opening to increase the amount of gas at the burner.

In line with the vertical passage $b^3$ is the opening $i$, which is closed by the screw $k$.

Fig. 5 illustrates another form of my invention in which the clamping-ring is formed entirely integral with the valve-body instead of using a separate saddle. The threaded lugs $m$ receive the screw $m'$, which when screwed up draws the washer $f$ close up against the pipe $a$. The passages $b^3$ $b^5$ communicate as before, a seat being formed at the entrance to the passage $b^5$, into which the conical end $g^3$ of the valve-stem enters.

The operation of tapping the pipe is as follows: The valve-body B is secured in position at the point where the pipe is to be tapped by means of the saddle $c$ engaging with lugs on said valve-body to form a ring around said pipe in the manner hereinbefore set forth. The valve is opened and the drilling-tool is passed up through the opening $i$, the screw $k$ having been removed, thence up through the valve-opening $g^2$ and passage $b^3$ until it strikes the pipe $a$. The further operation of the drill taps the hole $a'$ in the pipe $a$, thereby opening communication between said pipe and the valve-body. The rubber washer $f$ forms a very tight packing between the valve-body and the pipe about this opening, so that leakage is prevented.

By the above operation a very simple way of tapping the pipe is provided, and it can be accomplished after the pipes of the range have been fitted up with connections, &c., as it is not necessary to slip the ring of the valve-body over the end of the pipe.

It is of course to be understood that while I have described my invention in connection with gas ranges or stoves yet its use may be extended to the tapping of pipes of all sizes and kinds, whether for conveying gas or liquids.

What I claim as my invention, and desire to secure by Letters Patent, is—

In a valve for tapping pipes, a valve-body having a clamping-ring adapted to encircle the supply-pipe, a vertical portion having a passage extending from the pipe down through said vertical portion and having an outlet at the lower end thereof, a plug closing said outlet, a portion projecting out at an angle to said vertical portion having an outlet-passage therein, said passages communicating, a valve controlling the communication, and said valve-body having an opening in line with the valve-opening and the angular passage, substantially as set forth.

In testimony whereof I, the said FREDERICK W. ROBERTSHAW, have hereunto set my hand.

FREDERICK W. ROBERTSHAW.

Witnesses:
ROBT. D. TOTTEN,
ROBERT C. TOTTEN.